United States Patent
Barsoum et al.

[11] Patent Number: 6,013,322
[45] Date of Patent: Jan. 11, 2000

[54] SURFACE TREATMENT OF 312 TERNARY CERAMIC MATERIALS AND PRODUCTS THEREOF

[75] Inventors: Michel W. Barsoum, Pennsauken, N.J.; Tamer El-Raghy, Philadelphia, Pa.

[73] Assignee: Drexel University, Philadelphia, Pa.

[21] Appl. No.: 09/351,079

[22] Filed: Jul. 9, 1999

Related U.S. Application Data

[63] Continuation of application No. PCT/US98/00297, Jan. 9, 1998
[60] Provisional application No. 60/035,367, Jan. 10, 1997.

[51] Int. Cl.⁷ .............................. B05D 3/02; B05D 3/04; B23B 9/00; B23B 19/00; B23B 9/04
[52] U.S. Cl. ..................... 427/376.1; 427/376.2; 427/377; 428/688; 428/696; 428/702; 428/704
[58] Field of Search .............................. 427/376.1, 376.2, 427/377; 428/688, 696, 698, 702, 704

[56] References Cited

U.S. PATENT DOCUMENTS

| | | | |
|---|---|---|---|
| 4,465,777 | 8/1984 | Shuford | 501/88 |
| 4,471,023 | 9/1984 | Shuford | 428/408 |
| 4,961,529 | 10/1990 | Gottselig et al. | 228/124 |
| 5,451,365 | 9/1995 | Barsoum | 419/10 |

OTHER PUBLICATIONS

Tong et al., Synthesis and High Temperature Properties of $Ti_3SiC_2$ ISC Composite, J. Mater. Sci. 30:3087–3090, 1995 (no mo).
Barsoum et al., Synthesis and Characterization of a Remarkable Ceramic: $Ti_3SiC_2$, J. Am. Ceram Soc:79(7)1953–56, 1996 (no mo).
Strife et al., Ceramic Coatings for Carbon–Carbon Composites, Cer. Bull. vol. 67 No. 2, 1988 (no mo).
Racqult et al., Solid–State Synthesis and Characterization of the Ternary Phase $Ti_3SiC_2$, J. Mater. Sc. 29:3384–3392, 1994.

*Primary Examiner*—Janyce Bell
*Attorney, Agent, or Firm*—Akin, Gump, Strauss, Hauer & Feld, L.L.P.

[57] ABSTRACT

A ceramic material is surface treated by contacting the surface of a 312 ternary ceramic material with a surface-modifying compound selected from carburization agents, silicidation agents, nitridation agents and boronization agents, at an elevated temperature of at least about 600° C. for a period of time sufficient to provide a surface reaction layer of at least about one micron in thickness in the surface-treated material, preferably having a surface hardness in excess of about 6 GPa. A product made by the method of this invention is also disclosed having a surface hardness in excess of about 6 GPa, preferably at least about 10 GPa.

25 Claims, No Drawings

SURFACE TREATMENT OF 312 TERNARY CERAMIC MATERIALS AND PRODUCTS THEREOF

CROSS-REFERENCE TO RELATED APPLICATION

This application is a continuation of International Application PCT/US98/00297, filed Jan. 9, 1998, which in turn claims the benefit of U.S. Provisional Patent Application No. 60/035,367, filed Jan. 10, 1997

STATEMENT REGARDING FEDERALLY SPONSORED RESEARCH OR DEVELOPMENT

The invention was made with support in part from the U.S. Government (National Science Foundation Grants MSS-9302216, CTS-9414035 and CMS-9512362). The U.S. Government may therefore have certain rights in the invention.

BACKGROUND OF THE INVENTION

This invention relates to the surface treatment of so-called 312 ternary ceramic materials to provide increased surface hardness and to the surface-treated products so made.

A ternary titanium silicon carbide compound, having the formula $Ti_3SiC_2$ and referred to as a 312 compound because of its 3-1-2 stoichiometry (and sometimes called titanium carbosilicide), has been the subject of recent research investigations reported in the literature. Most of these reports have been directed to $Ti_3SiC_2$ synthesis methods and to characterization of its properties; see, e.g., Barsoum et al., *J. Am. Ceram. Soc.* 79: 1953–1956 (1996); Radhakrishnan et al., *Scripta Materialia* 34: 1809–1814 (1996); Arunajatesan et al., *J. Am. Ceram. Soc.* 78: 667–672 (1995); Lis et al., *Materials Lett.* 22: 163–168 (1995); Tong et al., *J. Mater. Sci.* 30: 3087–3090 (1995); Komarenko et al., *Ceram. Eng. Sci Proc.* 15: 1028–1035 (1994); Okano et al., *Advanced Materials '93*, I, A., "Ceramics, Powders, Corrosion and Advanced Processing", Mizutani, ed., Elsevier Science B.V., Amsterdam, pp. 597–600 (1994); Racault et al., *J. Mater. Sci.* 29: 3384–3392 (1994); Pampuch et al., *J. Mater. Syn. Proc.* 1:93–100(1993); and Pampuch et al., *J. Europ. Ceram. Soc.* 5:283–287 (1989).

Several reports describe use of or formation of $Ti_3SiC_2$ as a bonding agent for joining silicon carbide workpieces; see, e.g., Morozumi et al., *J. Mater. Sci.* 20: 3976–3982 (1985) and Gottselig et al., U.S. Pat. No. 4,961,529.

The physical characteristics described for this relatively new ceramic material suggest that $Ti_3SiC_2$ may be a ceramic material with unusual properties superior to those of conventional brittle ceramic materials. $Ti_3SiC_2$ is a high strength, high temperature-stable material that has been characterized as having good workability, i.e., being ductile and exhibiting plastic behavior at elevated temperatures.

Methods for the synthesis of 312 ceramic compounds are described in pending U.S. patent application Ser. No. 08/726,473 of Barsoum et al., filed Mar. 6, 1996 and entitled "Synthesis of 312 Phases and Composites Thereof". A process for the densification of $Ti_3SiC_2$ and other 312 ternary compounds is described in pending U.S. patent application Ser. No. 08/755,277 of Barsoum et al., filed Nov. 22, 1996 and entitled "Process for Making a Dense Ceramic Workpiece".

The physical characteristics and workability properties of these 312 ternary compounds make them useful as ceramics intended for high strength and high temperature applications.

The present invention provides a method for surface treating 312 ternary ceramic materials to provide improved physical properties for these materials.

BRIEF SUMMARY OF THE INVENTION

One aspect of this invention is a method for surface treating a ceramic material by contacting the surface of a 312 ternary ceramic material with a surface-modifying compound selected from the group consisting of carburization agents, silicidation agents, nitridation agents and boronization agents, at an elevated temperature of at least about 600° C. for a period of time sufficient to provide a surface reaction layer of at least about 1 micron in thickness in the surface-treated material, and cooling the surface-treated material.

Another aspect of the invention is a product made by this method having a surface hardness of at least about 10 GPa.

BRIEF DESCRIPTION OF THE SEVERAL VIEWS OF THE DRAWINGS

The foregoing "Brief Summary of the Invention", as well as the following "Detailed Description of the Invention" will be better understood when read in conjunction with the appended drawings. In the Drawings:

FIG. 1 is a graph showing the effect of carburizing temperature on the surface hardness of $Ti_3SiC_2$ contacted with graphite foil for four hours.

FIG. 2 is a graph showing the effect of carburizing time on the surface hardness of $Ti_3SiC_2$ contacted with graphite foil at 1600° C.

FIG. 3 is a graph showing the effect of carburizing time on thickness of the surface layer formed on $Ti_3SiC_2$ contacted with graphite foil at 1600° C.

FIG. 4 is a graph showing the effect of siliciding time on thickness of the surface layer formed on $Ti_3SiC_2$ contacted with a silicon wafer at 1350° C.

DETAILED DESCRIPTION OF THE INVENTION

The present invention is directed to increasing the surface hardness, wear resistance and oxidation resistance of 312 ternary ceramic materials. In the method of this invention, the surface of a 312 ternary ceramic material is treated at elevated temperature with a carburization agent, silicidation agent, nitridation agent and/or boronization agent for a period of time sufficient to provide a surface reaction layer of at least about 1 micron in thickness, and more preferably 10 microns in thickness. The surface treatment method of this invention is particularly useful for providing increased surface hardness, wear resistance and/or oxidation resistance in the treated material. Surface hardness is improved for the 312 ternary ceramic materials in the method of this invention to a surface hardness in excess of about 6 GPa, preferably at least about 10 GPa. The invention is useful in the treatment of ceramic workpieces, coatings and the like made from or containing a 312 ternary ceramic material on the exposed surfaces.

The 312 ternary ceramic materials treated according to this invention are a ternary compound consisting essentially of three elements in a regular repeating array. The 312 ternary ceramic compound may be present as a 312 phase in relatively pure form or may be present as a major component in a solid solution. The 312 ternary ceramic materials of this invention comprise a compound having the formula $M_3X_1Z_2$, where M is one or more transition metals, X is one or more co-metals (which are not transition metals), such as Al (aluminum), Ge (germanium) and Si (silicon) and Z is one or more non-metals such as B (boron), C (carbon) and N (nitrogen). The designation "312" is taken from the molar ratio of M:X:Z in the phase, and the stoichiometry of the 312 ternary ceramic compounds treated according to this invention is such that the M:X:Z atomic ratio is substantially centered around 3:1:2.

Methods for the synthesis of 312 ceramic compounds useful in this invention are described in pending U.S. patent application Ser. No. 08/726,473 of Barsoum et al., filed Mar. 6, 1996 and entitled "Synthesis of 312 Phases and Composites Thereof", the disclosure of which is hereby incorporated by reference. A process for the densification of $Ti_3SiC_2$ and other 312 ternary compounds, which are also useful in this invention, is described in pending U.S. patent application Ser. No. 08/755,277 of Barsoum et al., filed Nov. 22, 1996 and entitled "Process for Making a Dense Ceramic Workpiece", the disclosure of which is hereby incorporated by reference.

The transition metal (M) in the 312 ternary ceramic material comprising a compound having the general formula $M_3X_1Z_2$ may include one or more transition metals. Exemplary transition metals are those of Group III (Sc, Y, La and Ac), Group IV (Ti, Zr and Hf), Group V (V, Nb, Ta) and Group VI (Cr, Mo and W) of the Elements (current IUPAC designations). Other exemplary transition metals are first row transition metals, e.g., Mn, Fe, Co, Ni and Zn. Transition metals that are preferred included Ti (titanium), Zr (zirconium), Hf (hafnium), V (vanadium) and Nb (niobium).

Preferred 312 ternary ceramic compounds include those having the general formula $M_3X_1Z_2$, i.e., where Z in the general formula shown above is C (carbon). Specific 312 ternary ceramic compounds that are preferred for use in this invention include $Ti_3SiC_2$, $Ti_3GeC_2$ and $Ti_3AlC_2$.

As mentioned above, the 312 ternary ceramic material may comprise a solid solution comprising the 312 ternary ceramic compound. Such solid solutions may be 312 phases wherein some of the transition metal (M in the general formula discussed above) is replaced with one or more different transition metals and/or some of the co-metal (X in the general formula discussed above) is replaced with one or more different co-metals and/or some of the non-metal (Z in the general formula discussed above) is replaced with one or more different non-metals. Exemplary solid solutions include $(Ti,Zr)_3SiC_2$, $(Ti,Hf)_3SiC_2$, $(Ti,Fe)_3SiC_2$, $(Ti,Hf)_3(Si,Ge)C_2$, $(Ti,Zr)_3(Si,Ge)(C,N)_2$, $(Ti,V)_3SiC_2$, $(Ti,V)_3Si(C,N)_2$, $(Ti,V)_3(Si,Ge)(C,N)_2$, $(Ti,V,Hf)_3(Si,Ge)(C,N)_2$, $(Ti,V,Hf)_3(Si,Ge,Al)(C,N)_2$.

In addition to 312 ternary compounds that are relatively pure 312 phases and/or solid solutions thereof, the 312 ternary ceramic material treated according to this invention may also comprise composites of 312 phases. Such composite 312 compositions may include a 312 phase which is in contact with at least one non-312 phase, the non-312 phase simply being any phase which is not a 312 phase as defined herein. Such non-312 phases are solids at room temperature and at atmospheric pressure and are preferably in thermal equilibrium with the 312 phase. Reference to a phase diagram will allow one of ordinary skill in the art to determine non-312 phases that are in thermal equilibrium with a 312 phase. Such 312 composites preferably have the 312 phase present as the predominant component and present as a matrix in which the non-312 phase is dispersed. Preferred non-312 phase materials that may be present with the 312 phase include $TiSi_2$ (titanium disilicide), $Ti_5Si_3C_X$, SiC and $TiC_X$ (where $0.5 \leq x \leq 1$); particularly where the 312 compound is $Ti_3SiC_2$; and $TiAl_2$, $Ti_5Al_{11}$ and TiAl, particularly where $Ti_3AlC_2$ is the 312 compound.

The 312 ternary ceramic material is treated in the present invention with a surface-modifying compound selected from the group consisting of carburization agents, silicidation agents, nitridation agents and/or boronization agents. Such agents are selected for their ability to react with the 312 ternary ceramic compound at the surface of the material being treated, to provide increased surface hardness and/or oxidation resistance, when the surface treatment is carried out at elevated temperature. The surface treatment is carried out at an elevated temperature of at least 600° C., so suitable carburization agents, silicidation agents, nitridation agents and boronization agents are typically those which are highly reactive at the elevated treatment temperature.

Surface-modifying compounds that are carburization agents include elemental carbon, including graphite and carbon black, carbon monoxide, carbon dioxide, carbides, hydrocarbons, carbonates, particularly carbonate salts, and the like, and mixtures of these. Other carbon sources may be used as the carburization agent provided that such materials or compounds are capable of providing carbon in a reactive form at the elevated treatment temperature.

Surface-modifying compounds that are silicidation agents include elemental silicon, silicon dioxide, silicon halides, silicon carbide, silicon nitride, silicides, silicones and the like, and mixtures of these. Other silicon sources may be used as the silicidation agent provided that such materials or compounds are capable of providing reactive silicon at the elevated treatment temperature.

Surface-modifying compounds that are nitridation agents include nitrogen, ammonia, nitrogen oxides, nitride and the like, and mixtures of these. Other nitrogen sources, including both inorganic and organic nitrogen-containing compounds, may be used as the nitridation agent provided such materials or compounds are capable of providing reactive nitrogen at the elevated treatment temperature.

Surface-modifying compounds that are boronization agents include elemental boron, borides, borates, boric acid, boric oxides, boron nitride, boron hydride, boron halides and boron phosphates and the like, and mixtures of these. Other boron-containing sources may be used as the boronization agent provided such materials or compounds yield reactive boron at the elevated treatment temperature.

The surface-modifying compound that is contacted with the 312 surface of the 312 ternary ceramic material being treated may be a solid phase, liquid phase or gaseous phase. For surface treatment of ceramic materials having complex surface geometries, a surface-modifying compound that is in the gaseous state at the treatment temperature is preferred for ensuring good contact with all portions of the exposed surface being treated.

As shown in the Examples described below, the surface-modifying compound may be in solid form, e.g., a foil or powder, or a gaseous form. The state (solid, liquid and/or gaseous) of the surface-modifying compound during treatment of the surface of the 312 ternary ceramic material is not critical for effecting an improvement in surface hardness and other properties.

The surface treatment of the 312 ternary ceramic material according to this invention is carried out at an elevated temperature, at least about 600° C. Preferably, the 312 ternary ceramic material is contacted with the surface-modifying agent at a temperature of at least about 800° C., and more preferably at about 800° C. to about 2000° C., and most preferably at a temperature of about 1000° C. to about 1800° C.

The 312 ternary ceramic material being treated is generally at ambient temperature, about 15° C. to about 30° C., prior to the surface treatment according to this invention. The 312 ternary ceramic material is preferably heated at a controlled heating rate to avoid unnecessary thermal stress on the material and/or workpiece being treated. Heating rates that are typically used in firing ceramics are satisfactory, e.g., within the range of about 50° C./hour to about 2000° C./hour, preferably about 200° C./hour to about 1200° C./hour. The temperature reached and maintained during this heating step in the surface treatment procedure is generally termed the "soaking" temperature. The soaking temperature is the temperature described above for contacting the surface of the 312 ternary ceramic material being surface treated with the surface-modifying compound. This soaking temperature is at least about 600° C. and is preferably within the temperature range of about 800° C. to about 2000° C., more preferably about 1000° C. to about 1800° C.

The heating step may be accomplished in conventional heating equipment used for heat processing ceramic materials, coatings and/or workpieces. Conventional furnaces may be used, e.g., vacuum, resistance-heated, induction-heated or microwave furnaces. Alternative heating means besides conventional furnaces may also be used; e.g., surface heating of the ceramic material surface being treated with the surface modifying agent, using a heating source such as laser excitation heating or the like.

The atmosphere during the surface treatment procedure at elevated temperature is preferably a non-oxidizing atmosphere. In procedures that use a surface-modifying compound that is in the solid state at the elevated treatment temperature, the atmosphere during the heating step may be a vacuum and/or a non-oxidizing atmosphere, including inert or reducing atmospheres. An inert atmosphere may be provided using a gas such as argon or helium.

For surface treatment procedures carried out using a surface-modifying compound that is in the gaseous state at the elevated treatment temperature used, the atmosphere during the heating step contains the surface-modifying compound. Other gases may also be present in the atmosphere containing the surface-modifying compound. In some situations, however, the presence of such other components may adversely affect the rate at which the surface-modifying compound reacts with the surface of the 312 ternary ceramic material being treated, e.g., by diluting the concentration of surface modifying agent.

Surface treatment of 312 ternary ceramic materials with a surface-modifying compound in the gaseous state may be carried out at subatmospheric, atmospheric or elevated pressures, with atmospheric or elevated pressures being preferred to provide more rapid reaction rates between the surface-modifying compound and the surface of the ceramic material being treated. Positive pressures during the heat treatment of the 312 ternary ceramic material being treated may range from slightly above atmospheric pressure to about 1000 MPa, with about 0.1 MPa to 100 MPa being preferred.

During the heat treatment step at the selected elevated temperature, the surface of the 312 ternary ceramic material is maintained in contact with the surface-modifying compound for a period of time sufficient to provide the desired increase in surface hardness and/or oxidation resistance being sought. The period of time at which the 312 ternary ceramic material is contacted with the surface-modifying agent at elevated temperature is preferably about 1 minute to about 20 hours, more preferably about 10 minutes to about 10 hours. Reaction times in the range of a few minutes to a few hours, e.g., about 5 minutes to about 5 hours, and more preferably less than about one hour, are possible by use of high treatment temperatures and/or high treatment pressures. Such high temperatures and/or pressures must be selected so as not to result in adverse changes in the 312 ternary ceramic material being treated.

The contact between the surface of the 312 ternary ceramic material and the surface-modifying compound is a physical contact, sufficient to facilitate reaction of the surface of the 312 ternary ceramic material with the modifying compound to effect formation of a surface reaction layer of at least 1 micron in thickness. The surface reaction layer that is formed is different in composition from the 312 ternary ceramic material being treated and provides the desired physical characteristics for the surface treated 312 ternary ceramic material, e.g., increased surface hardness, wear resistance and/or oxidation resistance.

After the s 312 ternary ceramic material is contacted with the surface-modifying compound at elevated temperature for an appropriate period of time, the ceramic material is cooled, e.g., by conventional furnace cooling or the like. The ceramic material is preferably cooled below about 100° C.

The surface treatment temperature and period of time at which the surface of the 312 ternary ceramic material is contacted with the surface-modifying compound are preferably selected to provide a surface reaction layer of at least about 1 micron in thickness in the surface treated material. The thickness of the surface reaction layer is more preferably at least about 10 micons in thickness. The thickness of the reaction layer may be readily determined by conventional methods, e.g., by visual measurement of the layer in a cross-section of the treated material.

The surface treatment temperature and period of time at which the surface of the 312 ternary ceramic material is contacted with the surface-modifying compound are more preferably selected to provide a surface hardness in excess of about 6 GPa in the surface treated material, and most preferably, a surface hardness of at least about 10 GPa in the surface treated material.

The surface hardness may be measured as microhardness using conventional procedures, e.g., using a Leco M-400 hardness tester. In Examples 1–9 described below, surface hardness measurements were made using a Leco M-400 hardness tester at a loading of 100 grams; in Example 10, measurements were made using the same tester but at loadings of 500 and 1000 grams. For purposes of this disclosure, references to specific values of surface hardness are intended to mean measurement of such values using a Leco M-400 tester at 1000 grams loading.

For $Ti_3SiC_2$ as the 312 ternary ceramic material, surface microhardness in the range of about 3–6 GPa is a representative hardness for this 312 ternary ceramic material.

The surface treatment method of the present invention results in a significant improvement in the surface hardness of a 312 ternary ceramic material being treated. Such improved surface hardness also provides increased wear resistance, a desirable property for applications of 312 ternary ceramic materials that are subject to mechanical wear.

The surface treatment method of the present invention also provides the surfaces of the treated 312 ternary ceramic material with improved resistance to oxidation. For example, the oxidation resistance of $Ti_3SiC_2$ that has not been surface treated has been measured and the parabolic rate constants were determined to be $1\times10^{-8}$ $kg^2m^{-4}s^{-1}$ at 1000° C. and $1.4 \times 10^{-5}$ $kg^2 m^{-4} s^{-1}$ at 1400° C. Although these oxidation resistance values are good, the surface treatment method of the present invention provides further improvement in these values of oxidation resistance, e.g., an improvement of at least about three orders of magnitude at 1400° C.

The invention will now be described and explained further by reference to the following specific illustrative non-limiting Examples.

EXAMPLE 1

This Example 1 illustrates the surface treatment of a $Ti_3SiC_2$ coupon by carburization, using graphite foil as the carbon source. A $Ti_3SiC_2$ ceramic bar was sliced to provide a coupon having dimensions of 4 mm×4 mm×1 mm. The surfaces of the coupon were polished up to 1200 SiC grit paper. The polished coupons were sandwiched between two graphite foil sheets, and a dead load of 1 kg mass was placed on the upper foil to ensure good contact between the surfaces of the graphite foil in contact with the polished surfaces of the $Ti_3SiC_2$ coupon. The $Ti_3SiC_2$ coupons in this configuration were placed in a vacuum furnace and subjected to a heating rate of 10° C. per minute and then maintained at a soaking temperature of 1600° C. for four hours. After this heat treatment at elevated temperature, the coupons were cooled to ambient temperature, about 20–25° C. After cooling, the graphite foil sheets were removed from the surface-treated $Ti_3SiC_2$ coupons, and the surface-treated coupons were evaluated as follows.

Evaluation of the surfaces of the treated coupons by X-ray diffraction and by scanning electron microscopy (SEM) showed the presence of a microporous layer of TiC phase (having a porosity in the range of 3–20%) that had formed on the surfaces in contact with the graphite foil. The thickness of the TiC-containing layer on the surfaces of the surface-treated coupons was measured and determined to be 50 microns in thickness. The surface hardness of the treated coupons was measured and determined to have a microhardness of 20–30 GPa. The surface hardness of the untreated $Ti_3SiC_2$ coupons, prior to the surface treatment described above, was about 4 GPa.

EXAMPLE 2

This Example 2 describes the surface treatment of $Ti_3SiC_2$ coupons by carburization following a procedure identical that used in Example 1 but at a different soaking temperature. The soaking temperature used in this Example 2 was 1400° C. (for four hours), in comparison to Example 1 which used a soaking temperature of 1600° C. (for four hours).

Evaluation of the surface treated $Ti_3SiC_2$ coupons by X-ray diffraction and SEM demonstrated that the treated surfaces of the coupons contained a microporous layer of TiC phase. The thickness of the TiC-containing layer on the surfaces of the treated coupons was measured and determined to be 9 microns in thickness. The surface hardness of the treated coupons was measured and was found to have a microhardness of 15–20 GPa.

These results demonstrate that the higher soaking temperature of 1600° C. used in Example 1, as compared with the 1400° C. temperature used in this Example 2, provided a treated surface having a higher microhardness and a much thicker TiC- and SiC-containing layer on the treated surfaces of the $Ti_3SiC_2$ coupons.

EXAMPLE 3

This Example 3 describes the surface treatment of $Ti_3SiC_2$ coupons by carburization following a procedure identical to that of Example 1, except that the coupons being treated were subjected to a soaking temperature of 1600° C. for 16 hours instead of the four-hour period used in Example 1.

Evaluation of the surface-treated coupons by X-ray diffraction and SEM demonstrated that the treated surfaces contained a microporous layer of TiC phase, as was the case in Examples 1 and 2. The thickness of TiC-containing layer on the treated surfaces of the coupons was measured and determined to be 70 microns, somewhat thicker than the 50-micron thickness obtained in Example 1. The surface hardness was also measured and found to have a microhardness of 20–30 GPa, the same as that obtained in Example 1 using an identical soaking temperature of 1600° C. but for a shorter soak time.

EXAMPLE 4

Example 4 describes the surface treatment of $Ti_3SiC_2$ coupons via nitridation, using nitrogen gas as the nitrogen source. The $Ti_3SiC_2$ coupons were prepared and polished as described in Example 1. The $Ti_3SiC_2$ coupons were then placed in a hot isostatic press which was provided with a nitrogen gas atmosphere. The coupons were subjected to a heating rate of 10° C. per minute and were maintained at a soaking temperature of 1550° C. for four hours, with the final pressure of nitrogen being about 40 MPa.

After being cooled, the surface treated coupons were evaluated by X-ray diffraction and were determined to contain porous TiN (on the surface) and TiC and SiC phases (both underlying the TiN) on the treated surfaces. The total thickness of the surface layers on the treated $Ti_3SiC_2$ coupons was measured and determined to be 200 microns in thickness. The hardness of the TiN on the treated surfaces was not measured. The TiN on the surface was removed by light polishing and the hardness of the underlying TiC/SiC layer was measured and found to have a microhardness of 20–30 GPa.

EXAMPLE 5

This Example 5 describes surface treatment of $Ti_3SiC_2$ coupons via silicidation using silicon wafers as the silicon source. The $Ti_3SiC_2$ coupons were prepared and polished as described in Example 1. The polished $Ti_3SiC_2$ coupons were next sandwiched between two silicon wafers under a dead load of 1 kg mass on the upper silicon wafer to provide good contact between the silicon surfaces in direct contact with the polished surfaces of the $Ti_3SiC_2$ coupons.

The $Ti_3SiC_2$ coupons in this configuration were placed in a vacuum furnace and subjected to a heating rate of 10° C. per minute and then maintained at a soaking temperature of 1350° C. for four hours. After this treatment, the treated coupons were cooled and evaluated.

Evaluation of the treated surfaces by X-ray diffraction showed the presence of $TiSi_2$ and SiC phases on the surfaces of the treated coupons. The thickness of the $TiSi_2$/SiC layer on the treated coupons was measured and determined to be about 100–120 microns in thickness. The hardness of the treated surface was measured and found to be 8–12 GPa. The oxidation resistance was also measured at 1400° C.: the parabolic rate constant for oxidative resistance was determined to have decreased at least three orders of magnitude from the value obtained for the ceramic material prior to surface treatment.

EXAMPLE 6

This Example 6 describes the surface treatment of $Ti_3SiC_2$ coupons by silicidation following the procedure described for Example 5, except that the soaking temperature was 1200° C. for two hours instead of 1350° C. for four hours as in Example 5.

After the treated coupons were cooled, evaluation of the surfaces by X-ray diffraction showed the presence of $TiSi_2$ and SiC phases on the treated surfaces, the same as found in Example 5. The thickness of the $TiSi_2$/SiC layer on the treated coupons was measured and determined to be 20 microns in thickness.

EXAMPLE 7

This Example 7 describes the surface treatment of $Ti_3SiC_2$ coupons by silicidation following the same procedure as used in Example 5, except that the soaking temperature was 1250° C. for two hours instead of 1350° C. for four hours as in Example 5. As compared with Example 6, the soaking temperature in this Example 7 was slightly higher at 1250° C. instead of 1200° C. for Example 6 (with soak time being two hours for both).

After the treated coupons were cooled, evaluation of the surface by X-ray diffraction showed the presence of $TiSi_2$ and SiC phases on the treated surface, as was the case in Examples 5 and 6. The thickness of the $TiSi_2$/SiC layer on the treated coupons was measured and determined to be 70 microns in thickness.

The results of these Examples 5–7 show that the thickness of the surface layer on the treated $Ti_3SiC_2$ coupons correlates directly with soaking temperature and/or soaking time used during the silicidation treatment, being thicker as temperature was increased or soak time was increased.

EXAMPLE 8

This Example 8 describes the surface treatment of a densified $Ti_3SiC_2$ coupon by carburization using graphite powder as the carbon source. A dense $Ti_3SiC_2$-containing ceramic material was first prepared for use in this Example by liquid phase sintering at elevated temperature of a $Ti_3SiC_2$ powder which also contained 15 volume percent $TiSi_2$ powder. The powdered mixture was sintered at a temperature of 1500° C. for two hours to form a dense ceramic material containing $Ti_3SiC_2$ and $TiSi_2$. This resulting $Ti_3SiC_2$-containing ceramic material was a two phase composite material that contained $Ti_3SiC_2$ and $TiSi_2$. The presence of the $TiSi_2$ provided an increased net silicon concentration for the composite ceramic material, as compared with a single phase of $Ti_3SiC_2$.

Coupons having dimensions of 5 mm×5 mm×2 mm were cut from this dense ceramic material. The coupons were next placed in a graphite crucible which was then packed with graphite powder so as to have the graphite in contact with the surfaces of the coupons. The coupons in this configuration were placed in a tube furnace having an argon atmosphere and subjected to heating at 10° C. per minute and then maintained at a soaking temperature of 1350° C. for two hours. After this treatment, the coupons were cooled and the excess graphite powder was removed from the surfaces of the treated coupons.

Evaluation of the surfaces of the treated coupons by X-ray diffraction and SEM determined that the surface layer contained TiC and SiC phases. In contrast to Examples 1–3 in which surface treated $Ti_3SiC_2$ material was microporous, the surface treated composite $Ti_3SiC_2$ material in this Example 8 was dense. The thickness of the surface layer on the treated coupons was measured and determined to be 15–20 microns in thickness. The hardness of the surfaces of the treated coupons was measured and determined to be about 15 GPa. The surface hardness of the untreated $Ti_3SiC_2$ coupons, prior to the surface treatment described above, was about 4 GPa.

EXAMPLE 9

This Example 9 describes the surface treatment of dense $Ti_3SiC_2$ coupons by carburization using graphite powder as was described for Example 8. This Example 9 differed from Example 8 in that the soaking temperature of 1350° C. was maintained for a period of eight hours, instead of the two-hour period used in Example 8. In other respects, the procedures used in Example 9 were identical to those described for Example 8.

After the treated coupons were cooled, they were evaluated by X-ray diffraction and SEM and the surface layer determined to contain TiC and SiC, as in Example 8. The thickness of the surface layer of the treated coupons was measured and determined to be about 40–50 microns in thickness, substantially thicker than the surface layer obtained for Example 8, which used a shorter soak time at an identical soaking temperature. The hardness of the surface layer of the treated coupons was measured and determined to be about 15 GPa, the same hardness as obtained in Example 8.

EXAMPLE 10

This Example 10 describes the results of experimental studies carried out for the carburization of a $Ti_3SiC_2$ material using the carburization procedure described for Examples 1–3 and the silicidation procedure described for Examples 5–7. The first study in this Example determined the effect of carburizing temperature on the surface hardness of $Ti_3SiC_2$ coupons contacted with graphite foil for four hours. The results of this study are shown in FIG. 1 which is a graph plotting surface microhardness ($H_V$ in units of GPa) as a function of temperature (° C.) used during the carburizing surface treatment. As shown in FIG. 1, carburizing temperatures ranged from 1400° C. to 1600° C. Two curves are shown in FIG. 1, one being surface microhardness measured using a Leco M-400 tester at 500 grams and the second at 1000 grams. Surface hardness was shown to increase as a fuinction of temperature, from a value of about 10 GPa at a carburizing temperature of 1400° C. to higher surface microhardness values as shown in FIG. 1 as the carburizing temperature was increased to 1600° C.

A second study was directed to the effect of carburizing treatment time on the surface microhardness of the $Ti_3SiC_2$ coupons contacted with graphite foil at 1600° C. The results are shown in FIG. 2 which is a graph of surface microhardness (again measured as described for the study summarized in FIG. 1) as a function of carburizing treatment time, with the carburization temperature maintained constant at 1600° C. As shown in FIG. 2, surface microhardness increased from a value of about 11–13 GPa at about one hour carburizing time to higher surface microhardness values as shown in FIG. 2 as the treatment time increased to 16 hours.

A third study was carried out concurrently with that described for the second study shown in FIG. 2. In this third study, the effect of carburizing time on the thickness of the surface layer formed on the $Ti_3SiC_2$ coupons was studied as a function of treatment time, using the same $Ti_3SiC_2$ coupons contacted with graphite foil at 1600° C. in the second study. As shown in FIG. 3, the thickness of the formed layer on the surface treated coupons increased from about 20 microns thickness at about one hour treatment time to about 65 microns thickness for 16 hours treatment time.

A final study was also carried out to evaluate the effect of silicidation treatment time on the thickness of the surface layer formed on $Ti_3SiC_2$ coupons contacted with a silicon wafer at a treatment temperature of 1350° C. The results are summarized in FIG. 4 which is a graph showing thickness of the surface layer formed on the $Ti_3SiC_2$ coupons as a function of surface treatment time, with the temperature being kept constant at 1350° C. As shown in FIG. 4, surface layer thickness increased from about 80 microns at one hour siliciding treatment time to about 250 microns thickness for 16 hours treatment time.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for surface treating a ceramic material which comprises contacting the surface of a 312 ternary ceramic material with a surface-modifying compound selected from the group consisting of carburization agents, silicidation agents, nitridation agents and boronization agents, at an elevated temperature of at least about 600° C. for a period of time sufficient to provide a surface reaction layer of at least about 1 micron in thickness in the surface-treated material, and cooling the surface-treated material.

2. The method of claim 1 wherein the contact time is sufficient to provide a surface reaction layer of at least about 10 microns in thickness.

3. The method of claim 1 wherein the contact time is sufficient to provide a surface hardness in excess of about 6 GPa.

4. The method of claim 1 wherein the temperature at which the 312 ternary ceramic material is contacted with the surface-modifying compound is at least about 1000° C.

5. The method of claim 4 wherein the contact time is sufficient to provide a surface hardness of at least about 10 GPa.

6. The method of claim 1 wherein the temperature at which the 312 ternary ceramic material is contacted with the surface-modifying compound is about 800° C. to about 2000°C.

7. The method of claim 1 wherein the period of time at which the 312 ternary ceramic material is contacted with the surface-modifying compound at elevated temperature is about 1 minute to about 20 hours.

8. The method of claim 1 wherein the 312 ternary ceramic material comprises a compound having the formula $M_3X_1Z_2$ where M is at least one transition metal, X is at least one of Al, Ge and Si and Z is at least one of B, C and N.

9. The method of claim 8 wherein the transition metal is an element selected from the group consisting Groups III, IV, V and VI of the Periodic Table of the Elements.

10. The method of claim 8 wherein the transition metal is selected from the group consisting of Ti, Zr, Hf, V and Nb.

11. The method of claim 10 wherein the 312 ternary ceramic compound comprises $Ti_3SiC_2$.

12. The method of claim 8 wherein the 312 ternary ceramic material comprises a compound having the formula $M_3X_1C_2$.

13. The method of claim 8 wherein the 312 ternary ceramic material comprises a compound having the formula $Ti_3X_1C_2$.

14. The method of claim 1 wherein the 312 ternary ceramic material is a solid solution containing a 312 ternary ceramic compound.

15. The method of claim 1 wherein the 312 ternary ceramic material is a composite containing a 312 ternary ceramic compound.

16. The method of claim 15 wherein the 312 ternary ceramic compound composite contains a silicon-containing compound.

17. The method of claim 16 wherein the 312 ternary ceramic compound composite contains a compound selected from the group consisting of $TiSi_2$, $Ti_5Si_3C_X$, SiC and $TiC_X$, where $0.5 \leq x \leq 1$ $TiSi_2$.

18. The method of claim 1 wherein the surface-modifying compound is a carburization agent selected from the group consisting of elemental carbon, carbon monoxide, carbon dioxide, carbides, hydrocarbons and carbonate salts.

19. The method of claim 1 wherein the surface-modifying compound is a silicidation agent selected from the group consisting of elemental silicon, silica, silicon halides, silicon carbide, silicon nitride, silicides and silicones.

20. The method of claim 1 wherein the surface-modifying compound is a nitridation agent selected from nitrogen, ammonia, nitrogen oxides and nitrides.

21. The method of claim 1 wherein the surface-modifying compound is a boronization agent selected from the group consisting of elemental boron, borides, borates, boric acid, boric oxides, boron nitride, boron hydride, boron halides and boron phosphates.

22. The method of claim 1 wherein the surface-treated 312 ternary ceramic material is cooled to a temperature below about 100° C.

23. A product made by the method of claim 1 having a surface hardness of at least 10 GPa.

24. The product of claim 23 wherein the 312 ternary ceramic material comprises $Ti_3SiC_2$.

25. A product made by the method of claim 1.

* * * * *